United States Patent
Wu et al.

(10) Patent No.: US 7,305,005 B1
(45) Date of Patent: Dec. 4, 2007

(54) CORRELATION SYSTEM AND METHOD FOR MONITORING HIGH-SPEED NETWORKS

(75) Inventors: Handong Wu, Los Angeles, CA (US); Xiao Qiang Zhou, Hacienda Heights, CA (US)

(73) Assignee: McAfee, Inc., Santa Clara, CA (US)

( * ) Notice: Subject to any disclaimer, the term of this patent is extended or adjusted under 35 U.S.C. 154(b) by 1012 days.

(21) Appl. No.: 10/213,559

(22) Filed: Aug. 5, 2002

(51) Int. Cl.
   *H04L 12/56* (2006.01)
(52) U.S. Cl. ............... 370/463; 370/419; 709/250
(58) Field of Classification Search ........... 709/224, 709/250; 370/463, 419
   See application file for complete search history.

(56) References Cited

U.S. PATENT DOCUMENTS 6,243,756 B1    6/2001  Whitmire et al. .......... 709/232
6,269,401 B1 *  7/2001  Fletcher et al. ........... 709/224

FOREIGN PATENT DOCUMENTS

WO    WO-95/12946    *  5/1995

OTHER PUBLICATIONS

Waldbusser, S. "Remote Network Monitoring Management Information Base" RFC 1271. Network Working Group. Nov. 1991. pp. 1-81.*

* cited by examiner

*Primary Examiner*—Derrick W. Ferris
(74) *Attorney, Agent, or Firm*—Zilka-Kotab, PC; Christopher J. Hamaty

(57) ABSTRACT

A system, method and computer program product are provided for adjusting results during network analysis. Initially, network communications are received. Such network communications are then processed utilizing first hardware to generate first results. Subsequently, the network communications are processed utilizing second hardware to generate second results. Either the first results and/or the second results are then adjusted for conforming with the other.

18 Claims, 4 Drawing Sheets

CORRELATION SYSTEM AND METHOD FOR MONITORING HIGH-SPEED NETWORKS

FIELD OF THE INVENTION

The present invention relates to monitoring networks, and more particularly to monitoring high-speed networks utilizing network analyzers.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic, or may also be used to classify packets into flows. For example, a database can be analyzed for certain kinds of duplication. One example of a network analyzer is the SNIFFER ANALYZER® device manufactured by NETWORK ASSOCIATES, INC®.

Most network analyzers are based on a remote monitoring (RMON) standard that has defined nineteen groups in order to characterize network communications profiles and operation states, ranging from the data-link layer up to the applications layer.

There is a current trend for more and more network interface card (NIC) vendors to provide some RMON functions, such as a statistics group function at the data-link layer. Such a function, for example, collects numbers for distribution of packet sizes (i.e. the number of packets whose lengths are less than 64 byte, 128 byte, or other sizes), packet types (i.e. unicast, multicast, or broadcast), etc.

As more and more NIC vendors provide some RMON functions, there is a need for RMON system vendors to leverage the NIC-based statistics group. In this way, the RMON system vendor can concentrate on other RMON functions, which already impose many technical challenges to be implemented in the context of high-speed gigabit network traffic. In other words, there is a need for offloading RMON functions such as the RMON statistics group to the NIC hardware, so that other network analyzer hardware may focus on other RMON functions with improved performance.

Unfortunately, the NIC-based statistics group often provides different network results than other RMON functions, due to the processing capability gap between the NIC hardware and the hardware platform used to implement the rest of the RMON functions. In particular, the NIC hardware may drop a different amount of packets with respect to the hardware platform used to implement the rest of the RMON functions. This "gap" can become wider as the network speed increases, and can cause inconsistencies among results from hardware platforms with different capacities.

There is thus a need to bridge this gap in order to provide a more meaningful RMON profile.

DISCLOSURE OF THE INVENTION

A system, method and computer program product are provided for adjusting results during network analysis. Initially, network communications are received. Such network communications are then processed utilizing first hardware to generate first results. Subsequently, the network communications are processed utilizing second hardware to generate second results. Either the first results and/or the second results are then adjusted for conforming with the other.

In one embodiment, the network communications may include packets. Moreover, the first hardware may include a network interface card. Further, the second hardware may include a network analyzer processor. As an option, the first hardware and the second hardware may be situated on separate network cards. In the alternative, the first hardware and the second hardware may be situated on a single common network card.

Optionally, the results may include statistics. Moreover, the results may include remote monitoring (RMON) statistics. Still yet, the results may include a RMON statistics group.

In another embodiment, a number of packets processed by the first hardware may be identified, as well as a number of packets dropped by the second hardware. In such embodiment, the adjusting may be carried out based on the number of packets processed by the first hardware and the number of packets dropped by the second hardware.

In particular, the adjusting may be carried out on a resulting statistic using the formula:

$$S' = S - (S * P_{dropbyhw2} / P_{prxbyhw1}),$$

where $S'$ is the adjusted statistic, $S$ is the original statistic, $P_{dropbyhw2}$ is the number of packets dropped by the second hardware, and $P_{prxbyhw1}$ is the number of packets processed by the first hardware.

In still yet another embodiment, the adjusting may be conditionally carried out. As an option, the adjusting may be conditionally carried out based on a threshold. Such threshold may, in turn, be based on the number of packets dropped by the second hardware.

These and other advantages of the various embodiments will become apparent upon reading the following detailed description and studying the various figures of the drawings.

BRIEF DESCRIPTION OF THE DRAWINGS

The foregoing and other aspects and advantages are better understood from the following detailed description of the various embodiments with reference to the drawings.

DESCRIPTION OF THE PREFERRED EMBODIMENTS

Figure 1:
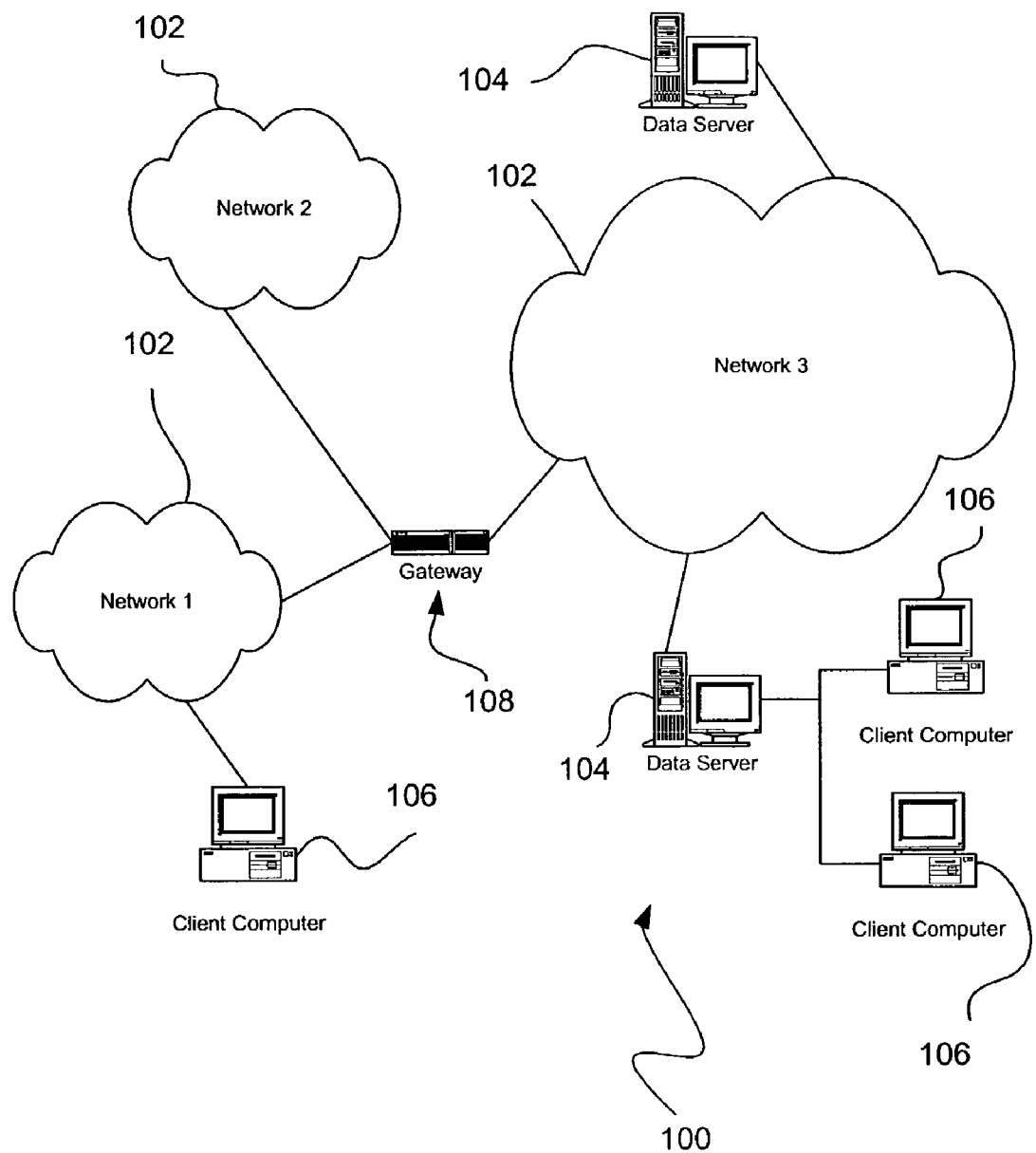
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway 108 is coupled therebetween. It should be noted that each of the foregoing network devices as well as any other unillustrated devices may be interconnected by way of a plurality of network segments.

Coupled to any one of the foregoing devices and/or segments may be a network analyzer. One exemplary network analyzer that may be used is the SNIFFER® network analyzer manufactured by NETWORK ASSOCIATES, INC®. In use, the network analyzer is generally adapted for monitoring and analyzing network communications, detecting bottlenecks, abnormal traffic, problems, etc. Furthermore, the network analyzer may be capable of various security functionality (i.e. intrusion detection, virus scanning, firewalling, etc.).

In use, the network analyzer is capable of adjusting results during network analysis for conforming results of network communications-processing by varying hardware. Initially, network communications are received. Such network communications are then processed utilizing first hardware to generate first results. Subsequently, the network communications are processed utilizing second hardware to generate second results. Either the first results and/or the second results are then adjusted for conforming with the other. More information regarding such a network analyzer will be set forth with reference to subsequent figures.

Figure 2:
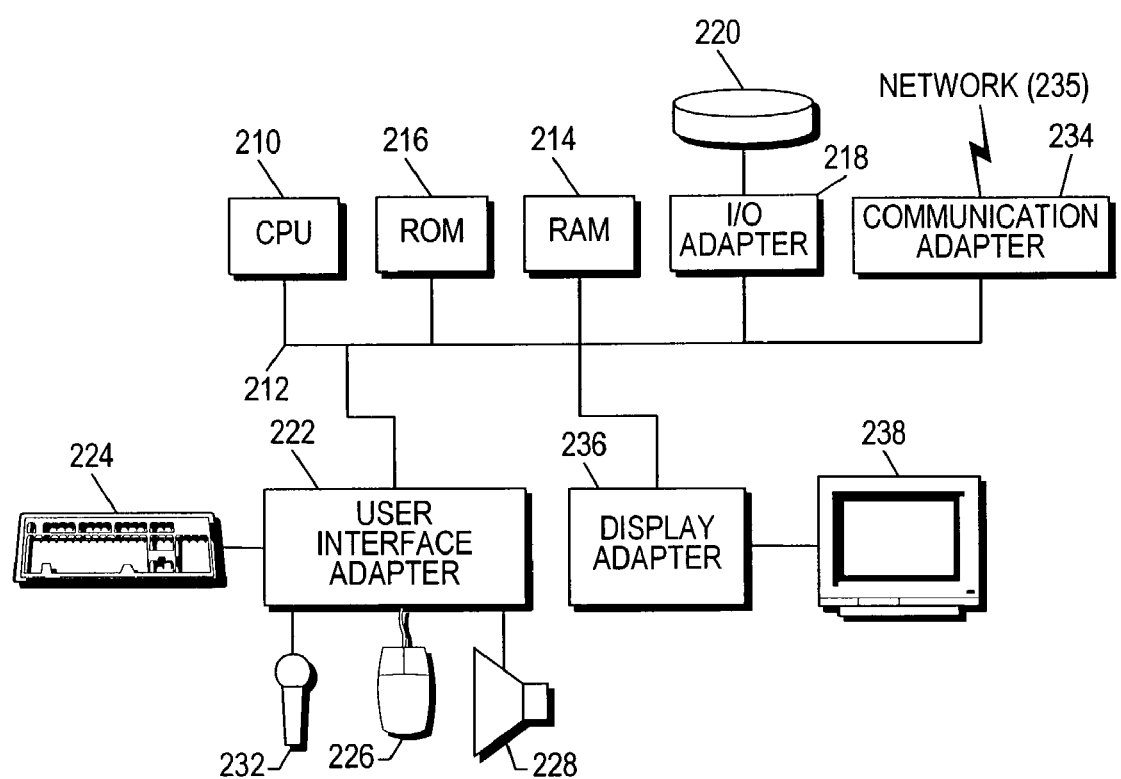
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++language, or other programming languages, along with an object oriented programming methodology. Object oriented programming (OOP) has become increasingly used to develop complex applications.

Figures 3A, 3B:
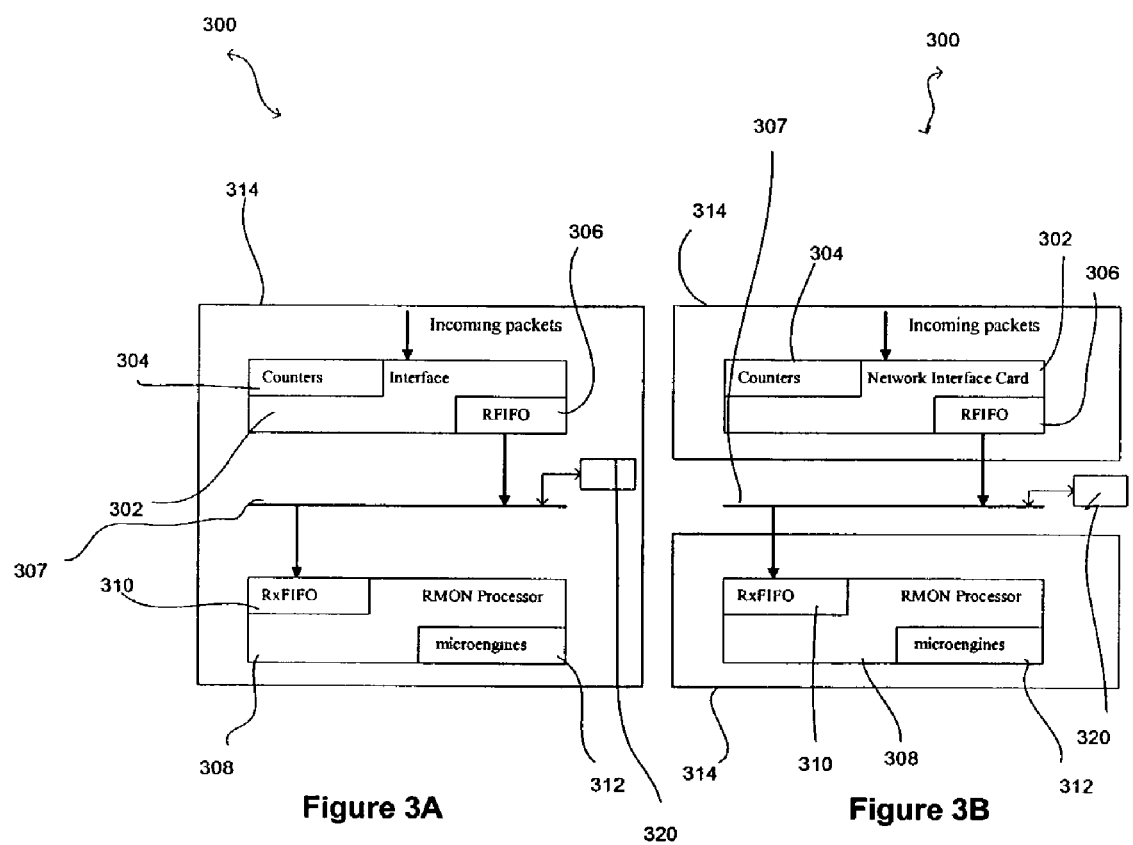
FIGS. 3A and 3B illustrate exemplary frameworks with which the present embodiment may be carried out.

FIGS. 3A and 3B illustrate exemplary frameworks 300 with which the present embodiment may be carried out. In one embodiment, the frameworks 300 may be implemented in the context of the aforementioned environment of FIGS. 1 and 2. Of course, the present frameworks 300 may be implemented in any desired content.

As shown, first hardware 302 is provided for being coupled to a network for receiving network communications therefrom. In the context of the present description, such network communications may include packets, frames, or any component of communications over a network.

In one embodiment, the first hardware 302 may include a network interface card (NIC) hardware. As shown, such NIC hardware may include a plurality of counter modules 304 for generating various results. Results, in the context of the present description, include any output generated for being used to monitor or analyze the network communications.

As an option, the results may result from fine-grain processing at lower level protocol layers. For example, the first hardware 302 may produce results including statistics and, more particularly, RMON statistics. Table 1 illustrates examples of such RMON statistics groups.

TABLE 1

EtherStatsOctets
EtherStatsPkts
EtherStatsBroadcastPkts
EtherStatsMulticastPkts
EtherStatsUndersizePkts
EtherStatsOversizePkts
EtherStatsFragments
EtherStatsJabber
EtherStatsPkts64Octets
EtherStatsPkts65to127Octets
EtherStatsPkts128to511Octets
EtherStatsPkts512to1023Octets
EtherStatsPkts1024to1518Octets
where EtherStatsPkts =
EtherStatsPkts64Octets
    + EtherStatsPkts65to127Octets
    + EtherStatsPkts128to511Octets
    + EtherStatsPkts512to1023Octets
    +
EtherStatsPkts1024to1518Octets
    + EtherStatsUndersizePkts
    + EtherStatsFragments
    + EtherStatsOversizePkts
    + EtherStatsJabber
also, EtherStatsPkts = RxUniOkCnt
    + EtherStatsBroadcastPkts
    + EtherStatsMulticastPkts
    + EtherStatsCRCAlignErrors
    + EtherStatsUndersizePkts
    + EtherStatsFragments
    + EtherStatsOversizePkts
    + EtherStatsJabber where RxUniOkCnt is the number of unicast packets with lengths between 64 bytes and the maximum packetsize, received without any errors.

Such results and/or network communications are then stored in a first first-in-first-out (FIFO) buffer 306 before being distributed via a bus 307.

Coupled to the first hardware 302 via the bus 307 is second hardware 308. As an option, the second hardware 308 may include a network analyzer processor.

In use, the second hardware 308 may receive the network communications from the first hardware 302 via a second FIFO buffer 310. As shown, the second hardware 308 may further include a plurality of micro-engine modules 312 for generating results based on processing of the network communications. Optionally, the results from the second hardware 308 may result from further processing at higher level protocol layers. Of course, the processing carried out by the second hardware 308 may supplement or compliment that of the first hardware 302 in any desired manner.

As a further option, the first hardware 302 and the second hardware 306 may be situated on separate platforms 314 (i.e. cards, etc.). See FIG. 3A. In the alternative, the first hardware 302 and the second hardware 306 may be situated on a single common platform 314. See FIG. 3B. Still yet, the aforementioned first and second results may be the output of different processing stages in a pipeline-type structure. Of course, the first hardware 302 and the second hardware 306 may be interrelated and interconnected in any desired manner.

As mentioned earlier, the results generated by the first hardware 302 and the second hardware 308 may be inconsistent due to a different amount of packets dropped by the first hardware 302 with respect to the second hardware 308, resulting from a difference in capacities, or any other factors. To overcome this difficulty, the present frameworks 300 are capable of adjusting either set of results for conforming them to the other. To this end, the results are consistent in nature, or normalized.

This way, the first hardware 302 may be relied upon for a first set of processing and the second hardware 308 may be used for a second set of processing, while both results can be used together to provide a consistent view of the status of the network communications. It should be noted that this consistency further allows for improved performance by offloading processing from the first hardware 302 to the second hardware 308, and visa-versa.

While the adjusting may be accomplished in any desired manner, additional information may be gathered, in accordance with one particular embodiment. For example, a number of packets ($P_{prxbyhw1}$) processed by the first hardware 302 may be identified, as well as a number of packets ($P_{dropbyhw2}$) dropped by the second hardware 308. In such embodiments, the results may be adjusted based on the number of packets processed by the first hardware and the number of packets dropped by the second hardware.

The identification of such information may be accomplished utilizing the first hardware 302, the second hardware 308, or any other desired software and/or hardware module. For example, a separate module 320 may be in communication with the first hardware 302 and the second hardware 308 via the bus 307.

As an option, the adjusting may be conditionally carried out. For example, the adjusting may be conditionally carried out based on a threshold. Such threshold may, in turn, be based on a number of packets dropped by the second hardware 308.

Figure 4:
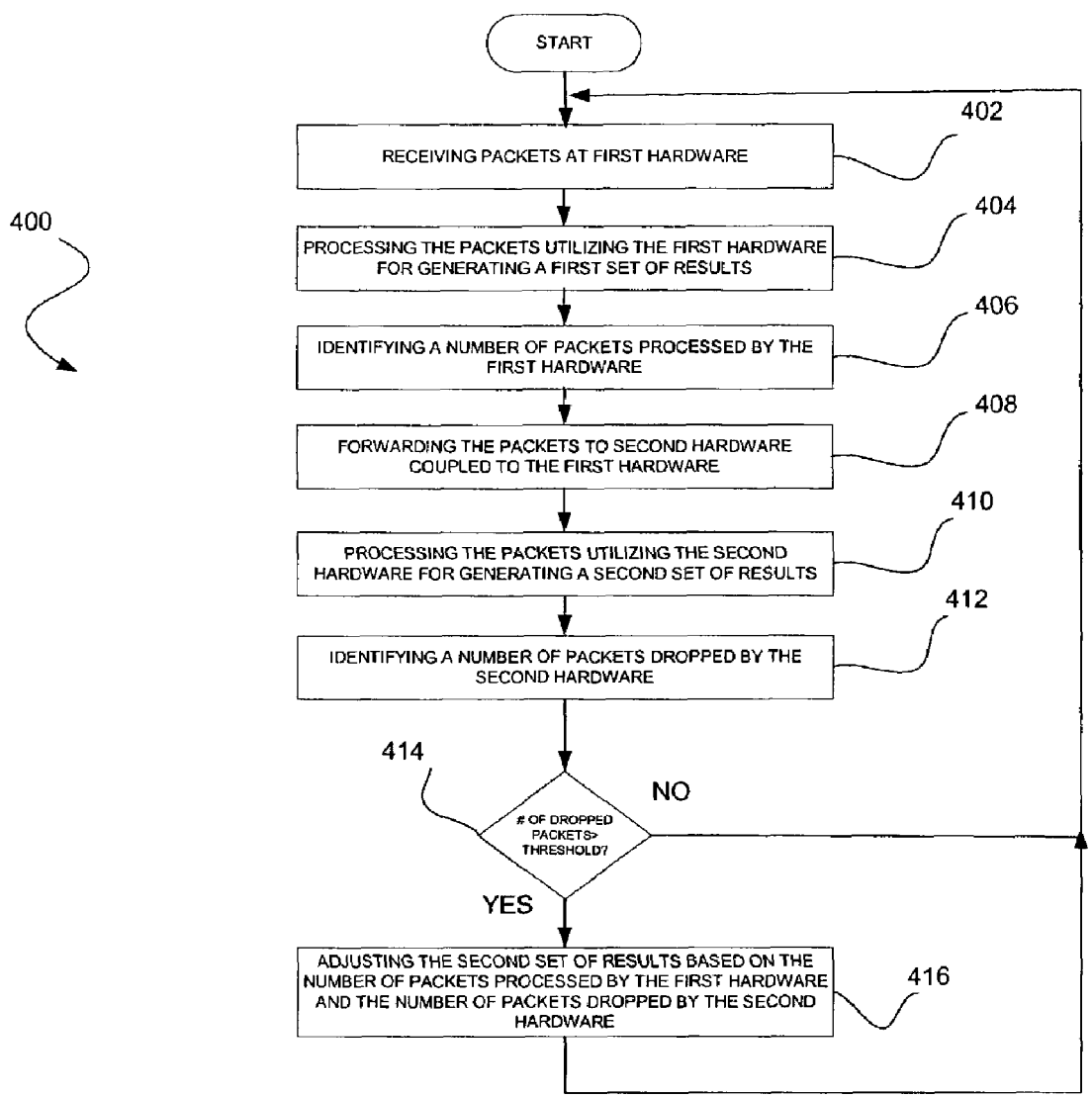
FIG. 4 shows a method of adjusting results during network analysis for conforming results of network communications-processing by varying hardware, in accordance with one embodiment.

More information regarding the manner in which this is carried out will be set forth during reference to FIG. 4.

FIG. 4 shows a method 400 of adjusting results during network analysis, in accordance with one embodiment. It should be noted that the present method 400 may be carried out using the network architecture of FIGS. 1 and 2. Of course, however, the present method 400 may be executed in any desired context and environment.

Initially, in operation 402, network communications are initially received. In one embodiment, this may be accomplished by first hardware such as that set forth hereinabove during reference to FIGS. 3A and 3B. Of course, however, any hardware is acceptable.

Still yet, the network communications may be processed utilizing the first hardware. Note operation 404. Before, during, or after such operation; a number of packets processed by the first hardware is identified for reasons that will soon become apparent. See operation 406.

Next, in operations 408 and 410, the network communications are forwarded to second hardware and processed to generate second results. As an option, this may be accomplished with second hardware such as that set forth hereinabove during reference to FIGS. 3A and 3B. Of course, however, any hardware is acceptable. Before, during, or after such operation; a number of packets dropped by the second hardware is identified. Note operation 412.

In decision 414, it is determined whether the number of packets dropped by the second hardware exceeds a predetermined threshold (a). While the threshold (a) may include any desired indicator, an exemplary threshold (a) may be calculated utilizing Equation #1. Moreover, the threshold may be set at any threshold (i.e. 1%) that is deemed to achieve the desired conformity.

EQUATION #1

$$a = (P_{dropbyhw2}/P_{prxbyhw1}) \times 100\%$$

where
a is the threshold,
$P_{dropbyhw2}$ is a number of packets dropped by the second hardware, and
$P_{prxbyhw1}$ is a number of packets processed by the first hardware.

If it is determined in decision 414 that the threshold has been exceeded, the first results and/or the second results are adjusted based on the number of packets processed by the first hardware and the number of packets dropped by the second hardware. Note operation 416. See Equation #2 for one specific exemplary way the resulting statistics may be adjusted. It should be noted that Equation #2 is set forth for illustrative purposes only and should not be construed as limiting in any manner.

EQUATION #2

$$S' = S - (S * P_{dropbyhw2}/P_{prxbyhw1})$$

where
S' is an adjusted statistic,
S is an original statistic,
$P_{dropbyhw2}$ is the number of packets dropped by the second hardware, and
$P_{prxbyhw1}$ is the number of packets processed by the first hardware.

Table #2 illustrates specific implementations of the foregoing algorithm of Equation #2 in the context of the RMON statistic groups set forth in Table #1.

TABLE 2

(EtherStatsBroadcastPkts)$_{after}$ = (EtherStatsBroadcastPkts)$_{before}$ −
((EtherStatsBroadcastPkts)$_{before}$/Pprxbyhw1) × (Pdropbyhw2)
(EtherStatsMulticastPkts)$_{after}$ = (EtherStatsMulticastPkts)$_{before}$ −
((EtherStatsMulticastPkts)$_{before}$/Pprxbyhw1) × (Pdropbyhw2)
(EtherStatsUndersizePkts)$_{after}$ = (EtherStatsUndersizePkts)$_{before}$ −
((EtherStatsUndersizePkts)$_{before}$/Pprxbyhw1) × (Pdropbyhw2)
(EtherStatsOversizePkts)$_{after}$ = (EtherStatsOversizePkts)$_{before}$ −
((EtherStatsOversizePkts)$_{before}$/Pprxbyhw1) × (Pdropbyhw2)
(EtherStatsFragments)$_{after}$ = (EtherStatsFragments)$_{before}$ −
((EtherStatsFragments)$_{before}$/Pprxbyhw1) × (Pdropbyhw2)
(EtherStatsJabber)$_{after}$ = (EtherStatsJabber)$_{before}$ −
((EtherStatsJabber)$_{before}$/Pprxbyhw1) × (Pdropbyhw2)

TABLE 2-continued $(EtherStatsPkts64Octets)_{after} = (EtherStatsPkts64Octets)_{before} - ((EtherStatsPkts64Octets)_{before}/Pprxbyhw1) \times (Pdropbyhw2)$
$(EtherStatsPkts65to127Octets)_{after} = (EtherStatsPkts65to127Octets)_{before} - ((EtherStatsPkts65to127Octets)_{before}/Pprxbyhw1) \times (Pdropbyhw2)$
$(EtherStatsPkts128to511Octets)_{after} = (EtherStatsPkts128to511Octets)_{before} - ((EtherStatsPkts128to511Octets)_{before}/Pprxbyhw1) \times (Pdropbyhw2)$
$(EtherStatsPkts512to1023Octets)_{after} = (EtherStatsPkts512to1023Octets)_{before} - ((EtherStatsPkts512to1023Octets)_{before}/Pprxbyhw1) \times (Pdropbyhw2)$
$(EtherStatsPkts1024to1518Octets)_{after} = (EtherStatsPkts1024to1518Octets)_{before} - ((EtherStatsPkts1024to1518Octets)_{before}/Pprxbyhw1) \times (Pdropbyhw2)$ where the subscript "before" denotes the number before adjustment, "after" denotes the number after the adjustment.

To this end, the adjusted results (i.e. statistics) of the first hardware are consistent with those of the second hardware, in light of the dropped packets of the second hardware. Of course, the results of the second hardware may be adjusted in view of the dropped packets of the first hardware. Still yet, the results may be adjusted per any parameter that differentiates the first hardware and the second hardware.

The present scheme thus bridges the gap between different RMON groups obtained by different hardware platforms, and provides unified monitoring results for high-speed networks. The scheme consists of two phases—detection and adjustment. During the detection phase, the RMON groups may be examined by comparing the total amount of network communications monitored by different groups individually. The actual gap may be compared against a pre-defined threshold. If the actual gap exceeds the threshold, the adjustment phase may be triggered. The adjustment phase, in turn, unifies the RMON group results as needed.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for adjusting results during network analysis, comprising:
    receiving network communications, wherein the network communications include packets;
    processing the network communications utilizing first hardware to generate first results;
    processing the network communications utilizing second hardware to generate second results;
    identifying a number of packets processed by the first hardware;
    identifying a number of packets dropped by the second hardware; and
    adjusting at least one of the first results and the second results for conforming with the other;
    wherein the adjusting is carried out based on the number of packets processed by the first hardware and the number of packets dropped by the second hardware.

2. The method as recited in claim 1, wherein the first hardware includes network interface card (NIC) hardware.

3. The method as recited in claim 1, wherein the second hardware includes a network analyzer processor.

4. The method as recited in claim 1, wherein the first hardware and the second hardware are situated on separate network cards.

5. The method as recited in claim 1, wherein the first hardware and the second hardware are situated on a single common network card.

6. The method as recited in claim 1, wherein the results include statistics, at least in part.

7. The method as recited in claim 1, wherein the results include statistics.

8. The method as recited in claim 1, wherein the adjusting is conditionally carried out.

9. The method as recited i claim 8, wherein the adjusting is conditionally carried out based on a threshold.

10. The method as recited in claim 9, wherein the threshold is based on the number of packets dropped by the second hardware.

11. The method as recited in claim 1, wherein the results include remote monitoring (RMON) statistics.

12. The method as recited in claim 11, wherein the results include a RMON statistics group.

13. A method for adjusting results during network analysis, comprising:
    receiving network communications;
    processing the network communications utilizing first hardware to generate first results;
    processing the network communications utilizing second hardware to generate second results; and
    adjusting at least one of the first results and the second results for conforming with the other;
    wherein the adjusting is carried out on a statistic using the formula $$S' = S - (S * P_{dropbyhw2}/P_{prxbyhw1}),$$

where S' is an adjusted statistic, S is an original statistic, $P_{dropbyhw2}$ is a number of packets dropped by the second hardware, and $P_{prxbyhw1}$ is a number of packets processed by the first hardware.

14. A computer readable medium having stored thereon a computer program product encoded with instructions being executed by a computer for adjusting results during network analysis, comprising:
    computer code for receiving network communications, wherein the network communications include packets;
    computer code for processing the network communications utilizing first hardware to generate first results;
    computer code for processing the network communications utilizing second hardware to generate second results;
    computer code for identifying a number of packets processed by the first hardware;
    computer code for identifying a number of packets dropped by the second hardware; and
    computer code for adjusting at least one of the first results and the second results for conforming with the other,
    wherein the adjusting is carried out based on the number of packets processed by the first hardware and the number of packets dropped by the second hardware.

15. A system for adjusting results during network analysis, comprising:
    means for receiving network communications, wherein the network communications include packets;
    means for processing the network communications utilizing first hardware to generate first results;
    means for processing the network communications utilizing second hardware to generate second results;

means for identifying a number of packets processed by the first hardware;
means for identifying a number of packets dropped by the second hardware; and
means for adjusting at least one of the first results and the second results for conforming with the other,
wherein the adjusting is carried out based on the number of packets processed by the first hardware and the number of packets dropped by the second hardware.

16. A system for adjusting results during network analysis, comprising:
first hardware for receiving network communications and processing the network communications to generate first results; and
second hardware for processing the network communications to generate second results;
wherein at least one of the first results and the second results is adjusted for conforming with the other,
wherein the adjusting is carried out based on a number of packets processed by the first hardware and a number of packets dropped by the second hardware.

17. A method for adjusting results during network analysis, comprising:
receiving network communications;
processing the network communications utilizing first hardware including network interface card (NIC) hardware to generate first results;
identifying a number of packets processed by the first hardware;
processing the network communications utilizing second hardware including a network analyzer processor to generate second results;
identifying a number of packets dropped by the second hardware;
determining whether the number of packets dropped by the second hardware exceeds a predetermined threshold; and
adjusting at least one of the first results and the second results based on the number of packets processed by the first hardware and the number of packets dropped by the second hardware, if it is determined that the number of packets dropped by the second hardware exceeds a predetermined threshold.

18. A method for adjusting results during network analysis, comprising:
receiving network communications, wherein the network communications include packets;
processing the network communications to generate first results;
processing the network communications to generate second results;
identifying a number of packets processed by a first hardware;
identifying a number of packets dropped by a second hardware; and
adjusting at least one of the first results and the second results for conforming with the other;
wherein the adjusting is carried out based on the number of packets processed and the number of packets dropped.

* * * * *

UNITED STATES PATENT AND TRADEMARK OFFICE
CERTIFICATE OF CORRECTION

PATENT NO. : 7,305,005 B1 Page 1 of 1
APPLICATION NO. : 10/213559
DATED : December 4, 2007
INVENTOR(S) : Wu et al.

It is certified that error appears in the above-identified patent and that said Letters Patent is hereby corrected as shown below:

Col. 8, line 13, replace "i" with -- in --;
Col. 8, line 56, replace "other," with -- other; --;
Col. 9, line 6, replace "other," with -- other; --;
Col. 9, line 18, replace "other," with -- other; --.

Signed and Sealed this

Twenty-first Day of December, 2010

David J. Kappos
*Director of the United States Patent and Trademark Office*